United States Patent [19]

Nakagawa

[11] Patent Number: 4,962,500
[45] Date of Patent: Oct. 9, 1990

[54] DATA PROCESSOR INCLUDING TESTING STRUCTURE FOR A BARREL SHIFTER

[75] Inventor: Katsuhiko Nakagawa, Tokyo, Japan

[73] Assignee: NEC Corporation, Tokyo, Japan

[21] Appl. No.: 236,834

[22] Filed: Aug. 26, 1988

[30] Foreign Application Priority Data

Aug. 28, 1987 [JP] Japan ................................ 62-215611

[51] Int. Cl.$^5$ .......................................... G06F 11/16
[52] U.S. Cl. ................................... 371/24; 371/21.2; 365/201
[58] Field of Search ................... 371/3, 72, 67.1, 68.2, 371/68.3, 69.1, 21.1, 21.2, 21.3, 22.3, 24, 25.1; 365/200, 201

[56] References Cited

U.S. PATENT DOCUMENTS

| | | | |
|---|---|---|---|
| 3,903,511 | 9/1975 | Lighthall | 365/201 |
| 4,313,199 | 1/1982 | Aichelmann | 371/21.2 |
| 4,363,124 | 12/1982 | Aichelmann | 371/21.2 |
| 4,669,061 | 5/1987 | Bhavsar | 365/201 |

*Primary Examiner*—Michael R. Fleming
*Attorney, Agent, or Firm*—Foley & Lardner, Schwartz, Jeffery, Schwaab, Mack, Blumenthal & Evans

[57] ABSTRACT

A data processor includes a barrel shifter receiving input data at input terminals thereof and producing shifted data at output terminals thereof in response to shift control data, the shifted data being temporarily stored in a storage circuit which, in turn, returns the data stored therein to the output terminals of the barrel shifter in response to a test-enable signal. Feed-back data derived from the input terminals of the barrel shifter by returning the stored data through the barrel shifter is then compared with the input data to produce a comparison output representing whether or not both data are the same.

8 Claims, 3 Drawing Sheets

DATA PROCESSOR INCLUDING TESTING STRUCTURE FOR A BARREL SHIFTER

BACKGROUND OF THE INVENTION

1. Field of the Invention

The present invention relates to a digital data processor and, more particularly, to a processor including a barrel shifter for shifting a digital signal having a plurality of bit data by an arbitrary number of bits with one shifting operation.

2. Description of the Related Art

In order to perform a rapid shift of an input data by a predetermined number of bits, a digital data processor such as a microcomputer includes a barrel shifter. The barrel shifter includes a plurality of MOS transistors arranged in a matrix form, a plurality of input signal lines for transmitting each bit of information of the input data, a plurality of output signal lines for transmitting each bit of information of the shifted output data and a plurality of shift control lines each connecting to gates of the MOS transistors arranged diagonally in the matrix. The source-drain path of each MOS transistor is connected between one of the input signal lines and one of the output signal lines. The shift data representative of a shifting amount or number is supplied selectively to the gates of MOS transistors through the shift control lines.

If any one of the input and output signal lines has an open-defect, if it has a short-defect connected to another or if any one of the MOS transistors has a structural defect, the barrel shifter does not execute a correct data-shift operation. Therefore, it is required to test whether or not the barrel shifter can operate normally.

However, the data processor in the prior art does not have a particular test circuit for the barrel shifter, and, therefore, the operation for judging whether or not the shifted data is correct must be carried out with the aid of an external test circuit. A reading operation of the shifted-data and an external judging operation are thereby required, so the test cannot be completed within a short period. A digital processor having a comparing function can compare, by using this function, the output data from the barrel shifter with true or reference data to perform the judging operation, but in this case, time and labor for writing the true data into the processor are required, because the true or reference data must be externally generating by shifting the input data.

Moreover, even if the barrel shifter passes the test, it may produce incorrectly shifted data due to a noise or surge voltage applied thereto in the actual operation state of the processor. However, the processor cannot detect the incorrect shifting-operation, so that the incorrectly shifted data will be utilized as true data in the signal processing operation.

SUMMARY OF THE INVENTION

It is therefore a major object of the present invention to provide a data processor equipped with a test circuit which can check whether or not the barrel shifter operates normally.

It is another object of the present invention to provide a data processor including a test structure for testing a barrel shifter at a high speed.

A data processor according to the present invention comprises a barrel shifter having a plurality of input terminals, a plurality of output terminals and a plurality of control terminals supplied with shift data representative of a shift value, means for supplying the input terminals of the barrel shifter with first data representative of data to be shifted, means for latching second data derived from the output terminals of the barrel shifter as a shifted result, means for returning the latched second data to the output terminals of the barrel shifter, means for deriving from the input terminals of the barrel shifter third data obtained by feeding the second data back to the input terminals through the barrel shifter, and means for comparing the third data with the first data.

If the barrel shifter performs a correct operation, the first and third data become coincident with each other, so that the comparing means produces a first output showing a correct shifting. On the other hand, the comparing means produces a second output showing a shifting failure when the first and third data are not equal to each other, so that it is detected that the barrel shifter executed the incorrect shift operation. Thus, a simple and quick test circuit for the barrel shifter is obtained, and the data processor can judge by itself whether or not the barrel shifter operates normally. Moreover, in an actually operating state, the processor can detect the production of the incorrectly shifted data caused by a noise or surge voltage, and thus may instruct the barrel shifter to reexecute the shift operation to obtain a true shifted-data.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENT

Figure 1:
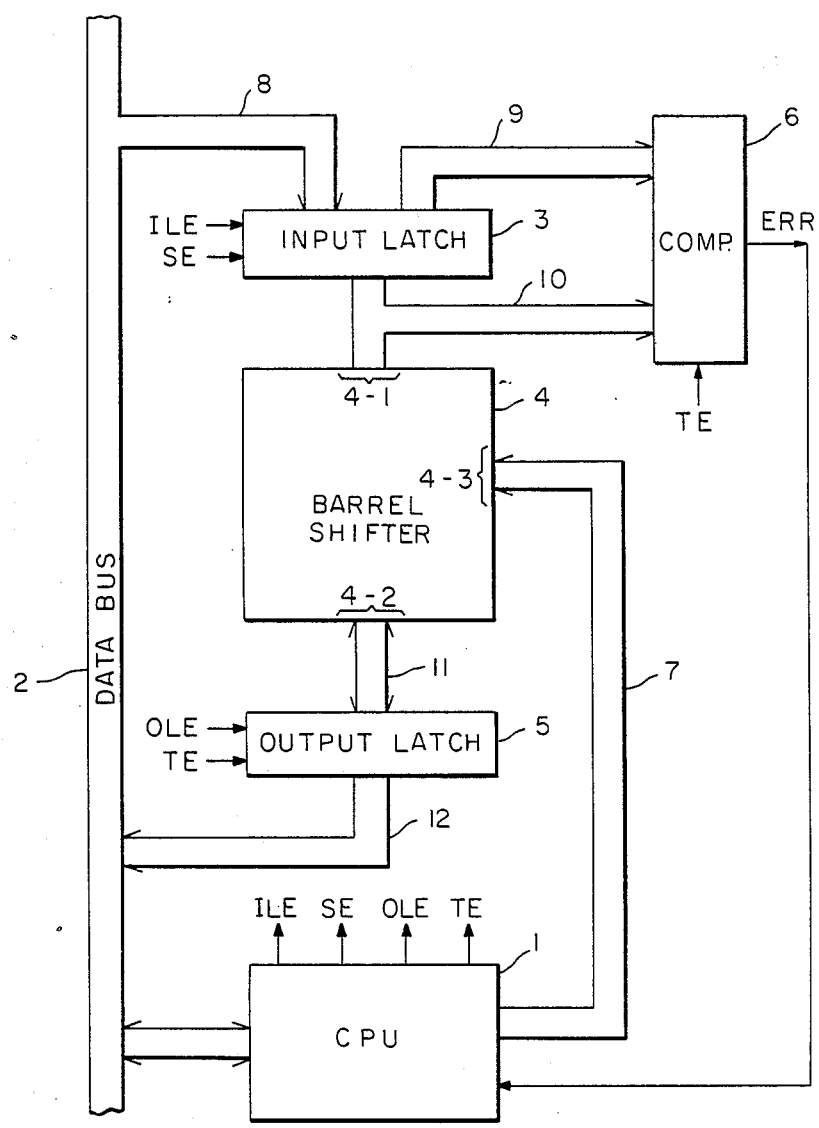
FIG. 1 is a block diagram representing an embodiment of the present invention.

Referring to FIG. 1, a data processor according to a preferred embodiment of the present invention includes a central processing unit (CPU) 1. The CPU 1 performs various data processing operations in accordance with instructions to be executed, and transfers the data to be shifted to an input latch circuit 3 via a data bus 2 and a branch bus 8 in response to a bit-shift instruction and to a test mode of a barrel shifter 4. The input latch circuit 3 latches the data to be shifted on the signal line 8 in response to an input latch-enable signal ILE generated by the CPU 1. The CPU 1 further supplies shift control data representative of the number of bits to be shifted to the control terminals 4-3 of the barrel shifter 4 through a control signal line 7. When the CPU 1 generates a shift-enable signal SEL, the input latch circuit 3 transfers the data to be shifted to the input terminals 4-1 of the barrel shifter 4, so that the barrel shifter 4 shifts the received data by the number of bits represented by the shift control data at one of the control terminals 4-3. The shifted result is transferred from the output terminals 4-2 to an output latch circuit 5 via a signal line 11. The output latch circuit 5 latches the shifted result in response to an output latch-enable signal OLE generated by the CPU 1 and then transfers it to the data bus 2 via a signal line 12.

In order to test the barrel shifter 4, a comparison circuit 6 is equipped in accordance with the present invention, and further the CPU 1 generates a test-enable signal TE. The test-enable signal TE is generated after the generation of the output latch-enable signal OLE, and is supplied to the output latch circuit 5 and to the comparison circuit 6. In response to the test-enable signal TE, the output latch circuit 5 returns or feeds back the resultant shifted data stored therein to the output terminals 4-2 of the barrel shifter 4 via the signal line 11. At this time, the shift control data supplied to the control terminals 4-3 of the barrel shifter 4 is the same as the shift control data used in shifting the input data stored in the input latch circuit 3 to obtain the shifted data latched in the output latch circuit 5. Therefore, so long as there is no defect in the barrel shifter 4, the data which is the same as the input data stored in the input latch circuit 3 reappears at the input terminals 4-1. The data appearing at the input terminals 4-1 are supplied to the first set of input terminals of the comparison circuit 6 via a signal bus 10. On the other hand, the input data stored in the input latch circuit 3 is supplied to the second set of input terminals of the comparison circuit 6 via a signal bus 9. The comparison circuit 6 compares these data through the signal bases 9 and 10 and supplies the result of comparison as a signal ERR to the CPU 1 in response to the test-enable signal TE. The signal ERR takes a low level when two supplied data are equal to each other. Therefore, the CPU 1 detects the level of the signal ERR and judges whether or not the barrel shifter 4 operates normally with respect to the input data to be shifted and the shift control data each having a predetermined pattern. When the signal ERR takes a low level to represent the coincidence of the two data, the test is repeated by changing contents of the input data to be shifted and/or the shift control data. Thus, the data processor shown in FIG. 1 performes a quick test of the barrel shifter 4 with a simple test structure.

The test-enable signal TE can be generated not only in the test mode but also in the actually operating mode. Accordingly, the CPU 1 can detect that the barrel shifter 4 passing the test happens to produce incorrectly shifted output data due to a noise or surge voltage applied thereto in the actually operating mode. The CPU 1 thereby instructs the barrel shifter 4 to reexecute the data shifting operation to obtain correct output data. Thus, the test structure may be self-tested to ensure the correct operation of the barrel shifter 4.

Figure 2:
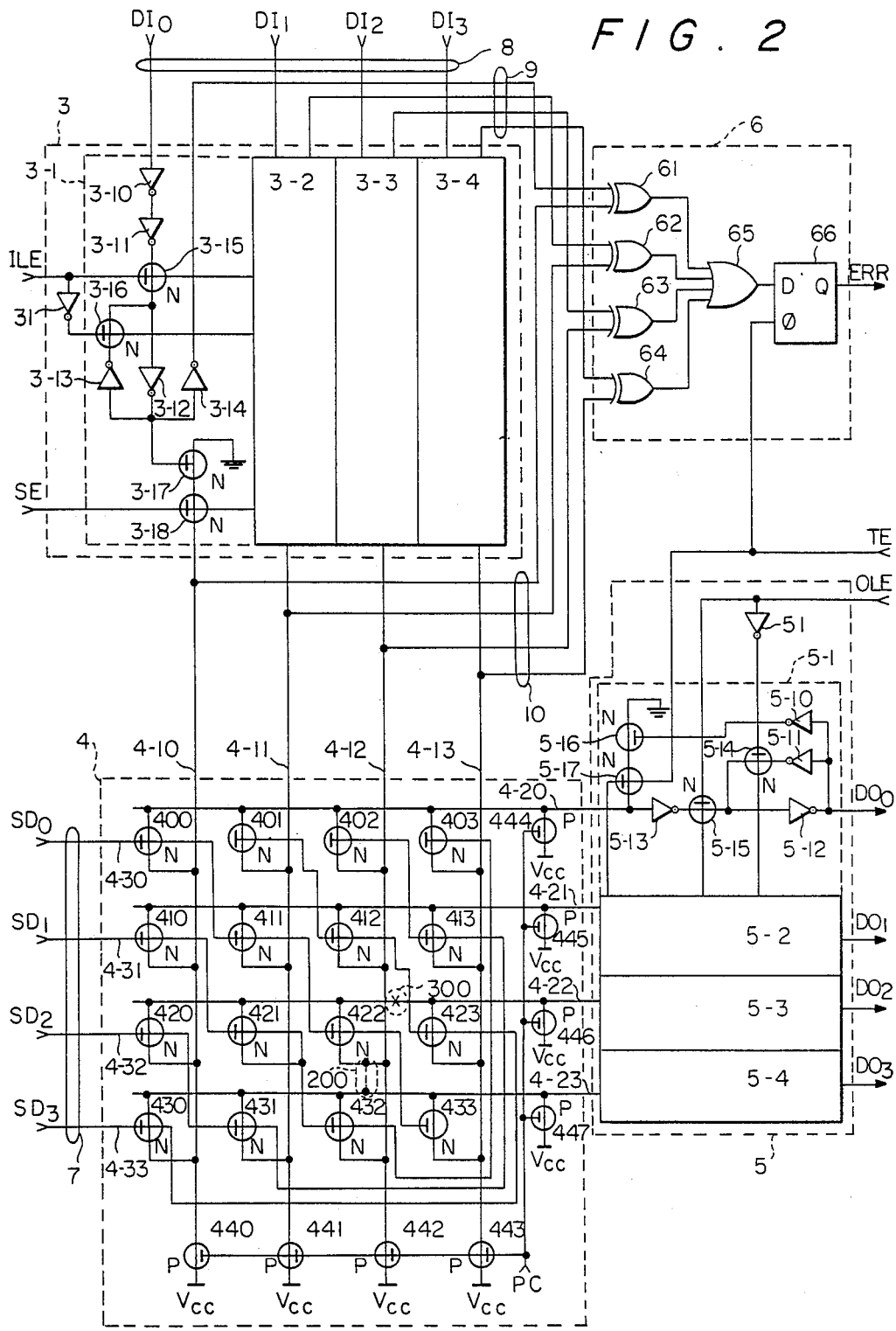
FIG. 2 is a circuit diagram representiving a detailed construction of the respective blocks shown in FIG. 1.

A detailed circuit of the barrel shifter and its test circuit of a four-bit construction is shown in FIG. 2 in which the same constituents as those shown in FIG. 1 are denoted by like reference numerals. Each bit of data of the input data $DI_0$–$DI_3$ to be shifted is supplied through the branch bus line 8 to the corresponding one of bit data latch units 3-1 through 3-4 of the input latch circuit 3, respectively. Since each of bit data latch units 3-1 to 3-4 has the same structure, only the first bit data latch unit 3-1 of the least significant bit (LSB) $DI_0$ is shown in detail. The bit data latch 3-1 includes five inverters 3-10 to 3-14 and four N channel MOS transistors 3-15 to 3-18 which are connected as shown. Particularly, the inverters 3-12 and 3-13 are connected in a flip-flop form via the transistor 3-16. When the input latch-enable signal ILE is not generated, that is, when the signal ILE takes a low level, the transistors 3-15 and 3-16 are turned OFF and ON, respectively, by an inverter 31, so that the previous data are stored therein. When the signal ILE is changed to a high level, the transistor 3-15 is turned ON to introduce new input data to be shifted, and the data is then latched. Each bit of data of the input data is transferred to the corresponding one of the input terminals 4-10 to 4-13 of the barrel shifter 4 through the transistors 3-17 and 3-18 by the generation of the shift-enable signal SE taking the high level. The output terminal of the inverter 3-12 is connected to the signal line 9 through the inverter 3-14, so that the input data to be shifted is supplied to the comparison circuit 16.

The barrel shifter 4 includes sixteen N-channel MOS transistors 400 to 433 arranged in a matrix form, and the source-drain path of each MOS transistor is connected between one of the input terminals 4-10 to 4-13 and one of the output terminals 4-20 to 4-23. The shift control data supplied from the CPU 1 through the signal line 7 consists of four bits $SD_0$ to $SD_3$ and are selectively applied to the gates of the transistors 400 to 433 as shown. One of the bits $SD_0$ to $SD_3$ of the shift control data takes logic 1 in accordance with the number of bits to be shifted. In the case of a two bit shifting operation, for example, only the third bit $SD_2$ takes logic 1. The input terminals 4-10 to 4-13 and output terminals 4-20 to 4-23 are precharged to a power source voltage $V_{cc}$ by P-channel MOS transistors 440 to 447 responsive to a precharge control signal PC.

The output terminals 4-20 to 4-23 are connected respectively to the bit data latch units 5-1 to 5-4 of the output latch circuit 5-1. Only the first latch unit 5-1 of the least significant bit (LSB) $DO_0$ is shown in the drawing because each of the latch units 5-1 to 5-4 has the same structure. The bit data latch unit 5-1 includes four inverters 5-10 to 5-13 and four N-channel MOS transistors 5-14 to 5-16 which are connected as shown. Particularly, the inverters 5-11 and 5-12 constitute a flip-flop. When the output latch-enable signal OLE is generated, that is, when the signal OLE takes the high level, the transistor 5-15 is turned ON to introduce and latch the resultant shifted data from the barrel shifter 4. The latched data are supplied to the data bus 2 (FIG. 1) and further to the gate of transistor 5-16 through the inverter 5-10. The transistor 5-17 receiving the test enable signal TE at its gate is disposed between the transistor 5-16 and the output terminal 4-20. When the test-enable signal TE is generated, therefore, the data $DO_0$ to $DO_3$ latched by the output latch circuit 5 are returned to the output terminals 4-20 to 4-23 of the barrel shifter 4. The data responsive to the data returned to the output terminals 4-20 to 4-23 thus reappear at the input terminals 4-10 to 4-13 through the transistors which are conductive in accordance with the shift control data $SD_0$ to $SD_3$, and are then transferred to the comparison circuit 6 through the signal line 10.

The comparison circuit 6 includes four exclusive-OR (EX-OR) gates 62 to 64 which in turn compare the data latched in the input latch circuit 3 and the data appearing at the input terminals 4-10 to 4-13. The outputs of the EX-OR gates 62 to 64 are applied to an OR gate 65 whose output is in turn supplied to the data input terminal D of a D-type flip-flop (D-FF) 66. The test-enable signal TE is supplied to the clock terminal $\phi$ of the D-FF 66 and the comparison result signal ERR is outputted from an output terminal Q thereof.

Figure 3:
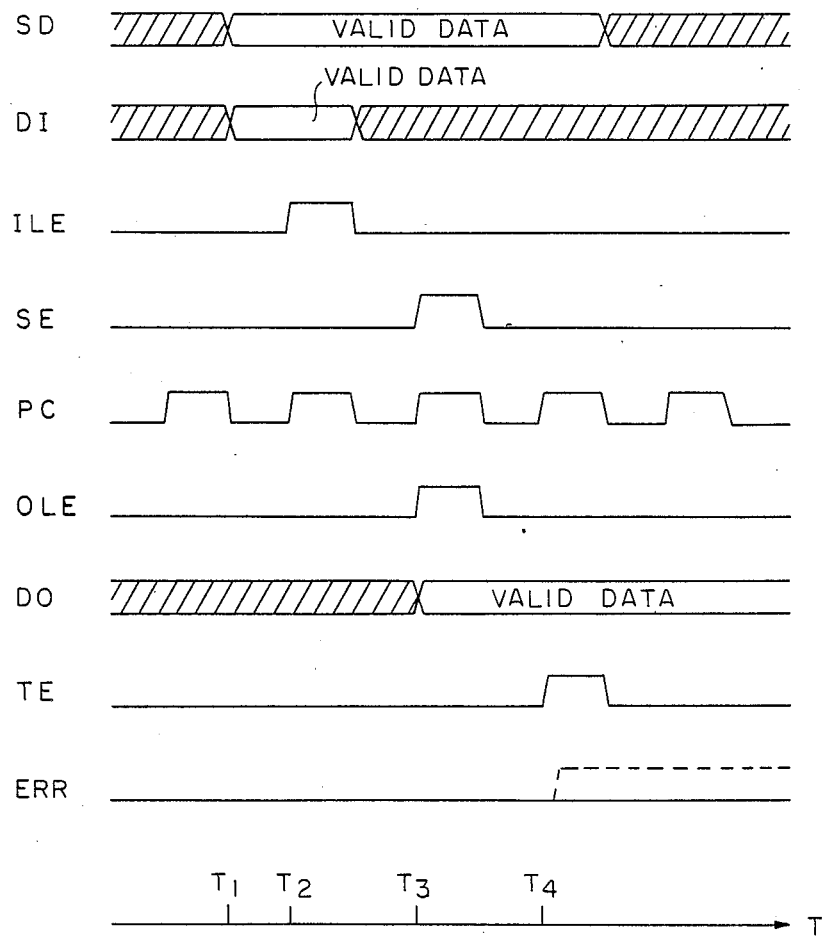
FIG. 3 is a timing chart representing an operation of the circuit shown in FIG. 2.

The circuit operation of FIG. 2 will be described below with reference to FIG. 1 and FIG. 3 showing a timing chart.

The CPU 1 transfers at a time point $T_1$ the valid input data to be shifted of "1101", for example, to the input latch circuit 3 via the data bus 2 and the branch bus 8, and sets the input latch-enable signal ILE to an active (high) level at a time point $T_2$. The input latch circuit 3 latches the data "1101" in response to this signal ILE. The input data thus latched is supplied to the comparison circuit 6 through the signal bus 9. The transistors 3-17 in the bit data latch units 3-1 to 3-4 are thereby turned OFF, OFF, ON, OFF, respectively. The CPU 1 further supplies the valid shift control data $SD_0$ to $SD_3$ to the shift control terminals 4-30 to 4-33 of the barrel shifter 4 at the time point $T_1$. In this illustration, the shift number is designed to be 0. Only the first bit $SD_0$ of the shift control data thereby takes logic 1.

At a time point $T_3$ indicating a deactive (high) level of the precharge signal PC, the CPU 1 sets the shift-enable signal SE and the output latch-enable signal OLE to the active (high) level. The signal SE turns the transistor 3-18 ON in each bit data latch unit of the input latch circuit 3. Therefore, only the bit data latch unit 3—storing the bit data "0" discharges the signal line of the input terminal 4-13 to the low level. In the barrel shifter 4, only the transistors 400, 411, 422 and 433 are in a conductive state and the remaining transistors are in a non-conductive state by the shift control data $SD_0$ to $SD_3$ As a result, so long as all the signal lines connected to the respective terminals 4-10 to 4-23 do not have any open-defect and short-defect, only the output terminal 4-22 is discharged to the low level via the transistor 422. The shifted output data derived from the output terminals 4-20 to 4-23 thus takes a value of "1101". This data is latched in the output latch circuit 5 by the output latch-enable signal OLE.

The precharge signal PC changes to the active (low) level in synchronism with the change of the shift-enable signal SE and the output latch-enable signal OLE to the deactive (low) level, so that the input and output terminals 4-10 to 4-13 and 4-20 to 4-23 and the signal lines connected thereto of the barrel shifter 4 are precharged to the high level.

The CPU 1 changes the test-enable signal TE to the active (high) level at a time point $T_4$ to turn the transistor 5-17 ON in the output latch circuit 5. The inversed level of the latched data is being supplied to the transistor 5-16 which is connected in series to the transistor 5-17. Therefore, only the third output terminal 4-22 is discharged to the low level. The shift control data $SD_0$ to $SD_3$ are held at the valid values even when the test enable signal TE is generated. As a result, the third input terminal 4-12 is discharged to the low level through the transistor 422, so that the data "1101" appear at the input terminals 4-10 to 4-13 and are then transferred to the comparison circuit 6 through the signal line 10.

Since both of the data supplied to the comparison circuit 6 are "1101", the EX-OR gates 61 to 64 all output the low level, and the OR gate 65 also outputs the low level. The D-FF 66 introduces the output of the OR gate 65 in synchronism with the test enable signal TE and thereby outputs the low level signal ERR.

The CPU 1 receives the low level signal ERR and detects that the barrel shifter 4 executes a correct shift operation with respect to the input data of "1101" and the shift control data of "1000". The CPU 1 continues to test the barrel shifter 4 by changing the shift control data $SD_0$ to $SD_3$ to "0100".

In the next case if a short-defect is present between the third input terminal 4-12 and the fourth output terminal 4-23, as represented by dotted line 200 in FIG. 2, the fourth output terminal 4-23 is also discharged to the low level by the discharge of the third input terminal 4-12. For this reason, the barrel shifter 4 produces the shifted data of "1100" to latch this data in the output latch circuit 5. When the data "1100" is returned to the output terminals 4-20 to 4-23 of the barrel shifter 4 in response to the test-enable signal TE, the third and fourth input terminals 4-12 and 4-13 are discharged to the low level, so that the data of "1100" is transferred to the comparison circuit 6. As a result, the EX-OR gate 64 generates the high level output and the signal ERR is inserted to the high level, as represented by dotted line in FIG. 3. Thus, the defect in the barrel shifter 4 is detected.

Alternately, as represented by dotted line 300 in FIG. 2, if there is an open-defect on the signal line connected to the third output terminal 4-22 between the transistors 422 and 423, the third output terminal 4-22 is not discharged, so that the output latch circuit 5 latches the data "1111". When this data is returned by the test-enable signal TE to the output terminals 4-20 to 4-23, the data "1111" is transferred to circuit 6, so that the EX-OR gate 63 generates the high level output. As a result, the signal ERR is inverted to the high level similarly.

As described above, a data processor according to the present invention can test a barrel shifter in a short time and with a simple testing structure, and moreover, it can check the shifted output data based upon the actual data processing operation.

The present invention is not limited to the above embodiments, but may be modified and changed without departing from the scope and spirit of the invention. For example, transfer gates controlled by the test-enable signal TE can be provided in the respective inputs of the EX-OR gates 61 to 64, and in that case, the D-FF 66 may be omitted. Exclusive NOR gates can be employed in place of the EX-OR gates. The precharge signal PC shown in FIG. 3 is then replaced by a signal that takes the deactive level (the low level) only when the signal SE, OLE or TE takes the active level (the high level).

What is claimed is:

1. A data processor, comprising:
   a barrel shifter having a plurality of input terminals, a plurality of output terminals, and a plurality of control terminals supplied with shift control data representative of a shift values;
   first data supplying means for supplying first data, to be shifted, to said input terminals of said barrel shifter;
   second data storing means for storing second data derived from said output terminals of said barrel shifter as a shifted result;
   returning means for returning said second data to said output terminals of said barrel shifter from said second data storing means to derive third data from said input terminals of said barrel shifter, said third data being obtained by feeding said returned second data back to said input terminals through said barrel shifter; and
   means, coupled to said first data supplying means and to said input terminals of said barrel shifter, for comparing said third data with said first data and for outputting a comparison result signal.

2. A data processor as claimed in claim 1, wherein the same shift control data is applied to said control terminals of said barrel shifter when said first data is shifted through said barrel shifter to obtain said second data and when said returned second data is feed back to said input terminals through said barrel shifter to obtain said third data.

3. A processor as claimed in claim 2, wherein said returning means includes initializing means for initializing electrical conditions of said input and output terminals of said barrel shifter before said second data is returned to said output terminals of said barrel shifter.

4. A processor as claimed in claim 3, wherein said initializing means precharges all of said input and output terminals to the same potential levels.

5. A data processor, comprising:
a first storage circuit temporarily storing input data;
a barrel shifter having a plurality of input terminals, a plurality of output terminals, and a plurality of control terminals receiving shift control data representative of a shift value;
first means for connecting said first storage circuit to said input terminals of said barrel shifter to transfer said input data to said barrel shifter during a first period;
a second storage circuit having a plurality of input nodes and a plurality of output nodes;
second means for connecting said output terminals of said barrel shifter to said input nodes of said second storage circuit to transfer resultant data, which is obtained by said barrel shifter performing a shift operation on said input data in response to a predetermined one of said shift control data, to said second storage circuit during said first period, said second storage circuit temporarily storing said resultant data;
third means for connecting said output nodes of said second storage circuit to said output terminals of said barrel shifter to feed said resultant data stored in said second storage circuit back to said output terminals of said barrel shifter during a second period that is different from said first period, said resultant data being further fed back to said input terminals through said barrel shifter receiving said predetermined one of said shift control data; and
fourth means, coupled to said first storage circuit and to said input terminals of said barrel shifter, for comparing said input data stored in said first storage circuit with data appearing at said input terminals of aid barrel shifter during said second period.

6. A processor as claimed in claim 5, further comprising fifth means for precharging said input and output terminals of said barrel shifter to a predetermined potential level during a third period between said first and second periods.

7. A processor as claimed in claim 5, wherein said first means disconnects said first storage circuit from said input terminals of said barrel shifter during said second period.

8. A data processor, comprising:
a barrel shifter;
an input latch circuit storing input data in response to an input latch-enable signal and transferring said input data to said barrel shifter in response to a shift-enable signal;
means for supplying shift control data representative of a shifting value to said barrel shifter, said barrel shifter performing a shift operation on said input data in response to said shift control data to output shifted data;
an output latch circuit storing said shifted data in response to an output latch-enable signal and returning said shifted data to said barrel shifter in response to a control signal, said barrel shifter producing feedback data in response to said returned shifted data and to said shift control data; and
a comparison circuit, coupled to said input latch circuit and to said barrel shifter, for comparing said input data with said feedback data.

* * * * *